UNITED STATES PATENT OFFICE.

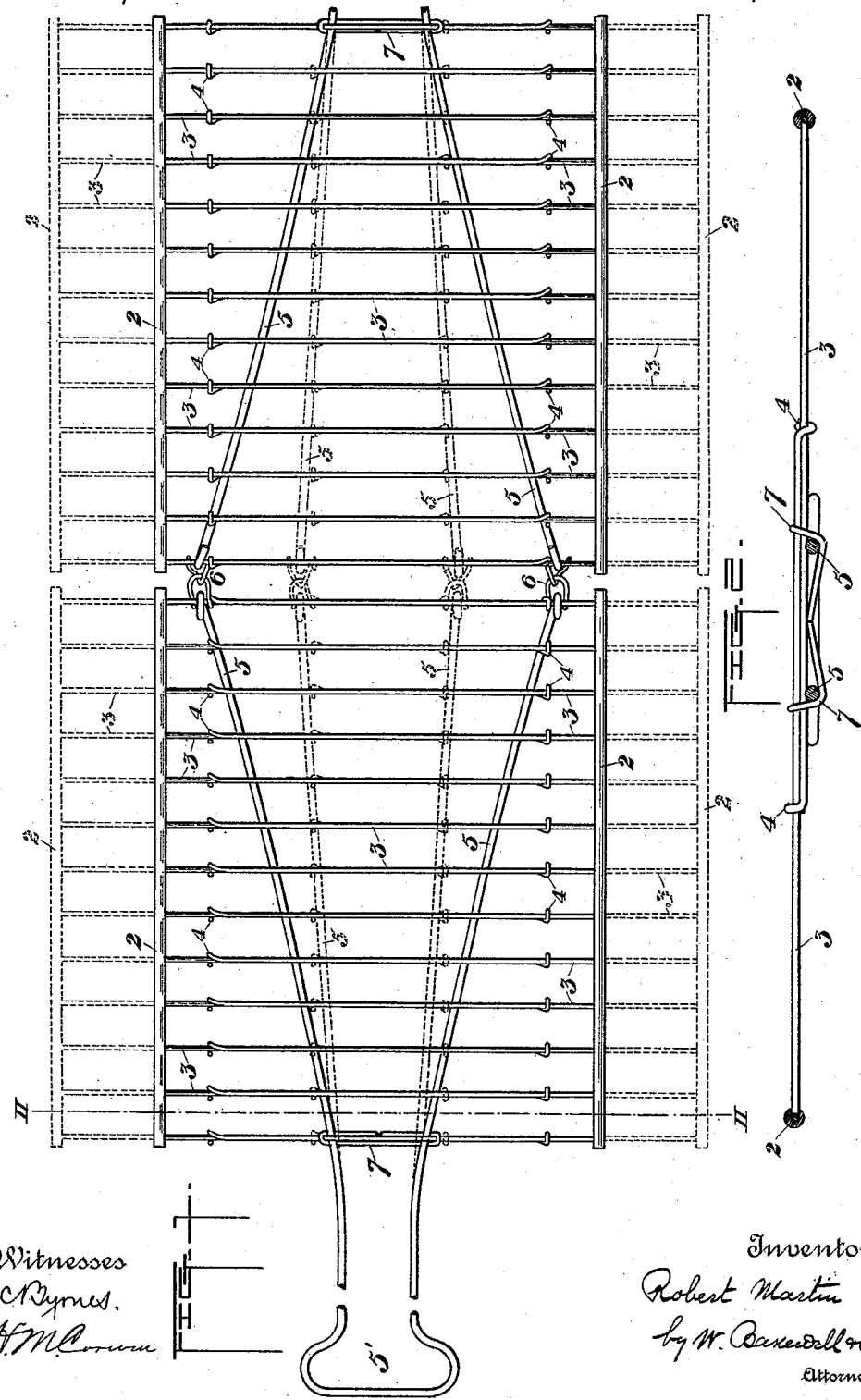

ROBERT MARTIN, OF PITTSBURG, PENNSYLVANIA.

BROILER OR TOASTER.

SPECIFICATION forming part of Letters Patent No. 486,880, dated November 29, 1892.

Application filed February 3, 1892. Serial No. 420,193. (No model.)

*To all whom it may concern:*

Be it known that I, ROBERT MARTIN, of Pittsburg, in the county of Allegheny and State of Pennsylvania, have invented a new and useful Improvement in Broilers or Toasters, of which the following is a full, clear, and exact description, reference being had to the accompanying drawings, forming part of this specification, in which—

Figure 1 is a plan view of my improved toaster, partly broken away; and Fig. 2 is an enlarged cross-sectional view on the line II II of Fig. 1.

My invention relates to that class of broilers or toasters in which two hinged grids or plates are employed, the substance to be heated being placed between the same; and it consists of a broiler so constructed that one or both halves may be widened or extended to produce a larger area for the substance placed between them.

In the drawings, 2 2 represent the side rods of each grid, from which rods extend the wires 3 3, composing said grid. These wires, as shown, are provided at their ends with loops 4, which inclose the corresponding wires extending from the opposite side rod, these loops being preferably bent up from the body of the wire itself. The handle consists of a doubled wire 5 bent into a loop 5' at its middle portion and having its inner ends bent about the innermost cross-wires within the hinge-loops 6. These hinge-loops are preferably simply enlarged loops formed upon the innermost cross-wires, the wire after forming the small loop to inclose the opposite cross-wire being passed through the large loop upon the other half of the grid and then bent back to form the hinge-loop. Where the handle-wires cross the outermost cross-wires a holding-loop 7 is bent over the cross and under the handle-wires, thus clamping the handle in place, as shown in Fig. 2. To widen the grid, it is simply seized by the side bars and pulled out into the position shown in dotted lines, the inner ends of the handle being brought correspondingly closer together.

It will be understood that wide variations may be made in the form and arrangement of the parts without departure from my invention, since what I claim is—

1. A grid for broiling or toasting having an extensible portion, substantially as described.

2. A toaster or broiler composed of extensible halves, substantially as described.

3. A toaster or broiler composed of hinged halves, each half having an extensible or telescoping section, substantially as and for the purposes described.

4. A toaster or broiler having side rods and wires extending inwardly therefrom, each wire having a loop inclosing the opposite wire, substantially as and for the purposes described.

5. A broiler or toaster composed of hinged halves, each half having side rods and cross-wires, each cross-wire terminating in an inclosing loop, substantially as and for the purposes described.

6. A broiler or toaster composed of hinged halves, each half having side rods and cross-wires, each cross-wire terminating in an inclosing loop, and handles attached to the hinges, substantially as and for the purposes described.

In testimony whereof I have hereunto set my hand this 29th day of January, A. D. 1892.

ROBERT MARTIN.

Witnesses:
H. M. CORWIN,
W. B. CORWIN.